United States Patent  (10) Patent No.: US 6,177,637 B1
Evans  (45) Date of Patent: Jan. 23, 2001

(54) SENSING SYSTEM

(75) Inventor: Jonathan P Evans, Warley (GB)

(73) Assignee: GEC Avery Limited (GB)

( * ) Notice: Under 35 U.S.C. 154(b), the term of this patent shall be extended for 0 days.

(21) Appl. No.: 09/085,722

(22) Filed: May 27, 1998

(30) Foreign Application Priority Data

Jun. 2, 1997 (GB) .................................................. 9711333

(51) Int. Cl.⁷ .......................... G01G 19/34; G01G 23/10; G01G 23/01; G06F 19/00; G01L 27/00
(52) U.S. Cl. .................. 177/25.13; 177/185; 73/1.13; 702/98; 702/99; 702/100; 702/101
(58) Field of Search ................... 177/25.13, 50, 177/185, 25.11; 73/1.13; 702/98, 99, 100, 101

(56) References Cited

U.S. PATENT DOCUMENTS

| 4,235,296 | * | 11/1980 | Knothe et al. | 177/204 |
| 4,909,338 | * | 3/1990 | Vitunic et al. | 177/50 |
| 5,172,783 | * | 12/1992 | Feinland et al. | 177/185 |
| 5,656,800 | * | 8/1997 | Naito et al. | 177/25.13 |
| 5,724,267 | * | 3/1998 | Richards | 177/25.13 |
| 5,756,938 | * | 5/1998 | Kono et al. | 177/25.13 |
| 5,780,777 | * | 7/1998 | Selig | 177/25.11 |
| 5,805,467 | * | 9/1998 | Richards | 702/100 |
| 6,034,334 | * | 3/2000 | Nakamura et al. | 177/25.18 |
| 6,047,244 | * | 4/2000 | Rud, Jr. | 702/98 |

FOREIGN PATENT DOCUMENTS

| 0 403 200 A1 | 12/1990 | (EP) . |
| 0 464 223 A1 | 1/1992 | (EP) . |
| 0 590 153 A1 | 4/1994 | (EP) . |
| 2 191 001 A | 12/1987 | (GB) . |

* cited by examiner

Primary Examiner—Randy W. Gibson
(74) Attorney, Agent, or Firm—Kirschstein, et al.

(57) ABSTRACT

A system for sensing the value of a physical property (such as force, temperature or movement) and having a plurality of sensors used in combination, for example a weighing system where a plurality of load cells are employed to sense the magnitude of a load placed on a weighing platform, has a first analogue to digital (A/D) converter and a second A/D converter, capable of faster operation than said first A/D converter; wherein said first A/D converter produces a signal representative of the average of the physical property and said second A/D converter produces a signal representative of the distribution of sensor output signal amplitudes amongst the sensors, thereby overcoming the problems associated with the prior art in producing a high resolution, high accuracy result but without requiring a high speed, high resolution A/D converter.

13 Claims, 1 Drawing Sheet

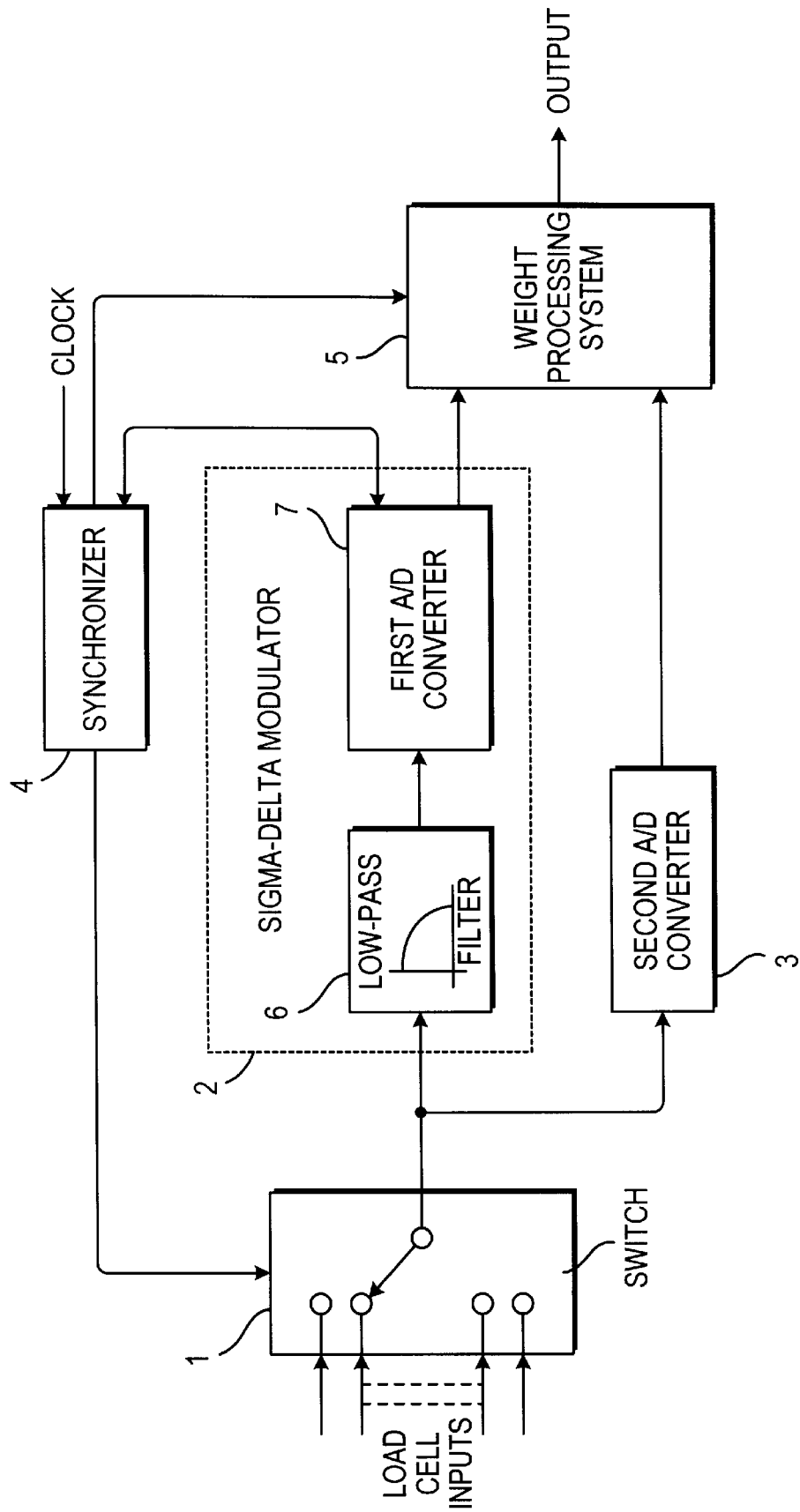

SENSING SYSTEM

BACKGROUND OF THE INVENTION

Field of the Invention

The present invention relates to systems for sensing the value of a physical property (such as force, temperature or movement) and having a plurality of sensors used in combination. One example of such a system is a weighing system where a plurality of load cells are employed to sense the magnitude of a load placed on a weighing platform.

In a weighing system, beneath the weighing platform is the bottomwork which includes the load cell or cells. Where there are multiple load cells, it is in practice impossible to guarantee an equal distribution of the load between them: some cells receiving a slightly larger weight than others. Due to imperfections in any load cell, the output signal will not be a linear function of the weight imposed on the cell. The unequal distribution of weight amongst the load cells will vary depending on the position of the load on the weighing platform. As a result, the non-linearity will introduce an error whose value will vary according to the positioning of the load on the weighting platform. This, in turn, will cause the weight readings to vary dependent on the position of the load. This is called cornering error and represents a small fraction of the load being measured.

Traditionally, two basic methods have been used to correct the errors. The first method is to wire all of the cells in parallel, each with its own empirically derived resistor added in order to compensate for differences between cells. This provides a single signal which can be measured by a low speed, high resolution analogue/digital (A/D) converter. However setting up of the compensation resistors is an iterative process that can be time consuming and expensive. This method can not correct for cornering errors caused by cell non-linearity.

The second method is to measure the output of each cell individually to the full accuracy requirement of the system. Measurements are taken by a single A/D converter that is switched to the output of each cell in turn. Such an arrangement is prone to vibration related interference. In order to avoid problems with typically low frequency vibration, a high speed A/D is required. The system can now resolve the weight on each individual cell allowing faster single pass calibration. In addition cell non-linearity can also be corrected. However high speed, high resolution A/D's are very expensive.

SUMMARY OF THE INVENTION

According to the present invention there is provided a sensing system comprising a plurality of sensors, switching means, a low pass filter, a first analogue to digital (A/ID) converter, and a second A/D converter capable of faster operation than said first A/D converter, said plurality of sensors for sensing the magnitude of a physical property, each sensor arranged to provide a separate output signal having an amplitude related to the magnitude of the physical property; said switching means arranged to sequentially connect said sensor output signals to the low pass filter, said low pass filter having an output to said first analogue to digital (A/D) converter, said switching means also arranged to sequentially connect the sensor output signals to said second A/D converter; wherein said first A/D converter is arranged to produce a first signal comprising information relating to the average of the physical property sensed by said plurality of sensors, and wherein said second A/D converter is arranged to produce a second signal comprising information relating to the distribution of sensor output signal amplitudes amongst the sensors.

BRIEF DESCRIPTION OF THE DRAWING

The present invention will now be described by way of example, with reference to the accompanying drawing in which is shown a block diagram of a twin A/D converter system.

DETAILED DESCRIPTION OF THE INVENTION

The circuit of the embodiment will first be described. Input signals derived from a plurality of load cells are taken to switching means 1. The output of switching means 1 forms the input signal to filter 6 and second A/D converter 3. A first A/D converter 7 capable of operation at low speed with high resolution is arranged to receive an input filtered by low pass filter 6. The first A/D provides a signal representative of the average of the physical property over all of the sensors. First A/D converter 7 together with filter 6 may be implemented in combination as a sigma-delta converter 2, as is well known in the art. Suitable sigma-delta modulators are disclosed by, for example, Weir, Electronics World and Wireless World, December 1989, p.1196–1198: "Sigma delta conversion" and Morgan, Electronics and Wireless World, August 1989, p.814–817:"Single-bit oversampling A-to-D converter".

A second A/D converter 3, capable of operation at high speed with low resolution is connected in parallel to the filter/first A/D converter combination. Since the second A/D 3 is concerned only with the distribution of the cell output signal amplitudes and not the absolute value, the actual value of any system gain in this area is unimportant assuming gain is held fairly constant over a low number of consecutive scans thus advantageously allowing the use of low-cost components. This also means that the input to the second A/D 3 can be AC coupled. This advantageously reduces the required dynamic range of the A/D since deadloads do not appear in the signal. Again, this can reduce system cost. The outputs from both A/D converters 7 and 3 are taken to weight processing system 5 for further processing. The timing of the various circuit blocks is controlled by means of timing signals generated by synchronising circuit 4 based on a clock input.

The operation of the circuit of the present embodiment will now be described.

The switching means selects an input from each load cell in turn to switch through to the output. Switching is carried out at a high rate and the resultant output signal from the switching means also changes at a high rate. First A/D converter 7 operates too slowly to be able to respond accurately to the fast changing switched signal. Filter 6 smooths the signal before it reaches first A/D converter 7. The signal output from first A/D converter 7 is therefore an accurate representation of the smoothed average value of the signals input from the plurality of load cells.

The signal output from switching means 1 is also input into second A/D converter 3. This is capable of faster operation but lower resolution when compared with first A/D converter 7. It is capable of responding fast enough to cope with the rate of change of the input switched signal and requires no filtering on its input. The signal output from second A/D converter 3 is therefore a low resolution representation of the individual values input from the load cells and in the sequence created by the switching means.

The signals output from the two A/D converters 7 and 3 are separately input to weight processing system 5. This would typically consist of a conventional microprocessor based system.

The signal input from first A/D converter 7, although high resolution as described above, will contain inaccuracies due to e.g. non-linear characteristics of the load cells. The weight processing system will use the information on the individual values from second A/D converter 3, typically in combination with previously provided information on the load cell characteristics and/or other parameters, to process the signal from the first A/D converter to produce a correction to improve the accuracy of the high resolution signal.

The present invention thus overcomes the problems associated with the prior art in producing a high resolution, high accuracy result but without requiring a high speed, high resolution A/D converter.

The above embodiment is by way of example only and it is to be understood that the invention is not limited to this precise implementation. Various modifications that would be apparent to the skilled man may be made without departing from the scope of the invention. In particular the invention may equally be applied to a system with different sensors, sensing for example temperature, pressure or movement.

What I claim is:

1. A system for measuring a physical property, comprising:
   a) a distribution of multiple sensors spaced apart from one another, and operative for sensing the property and generating individual electrical sensor output signals having individual values dependent upon the distribution of the sensors;
   b) a switch for conducting the sensor output signals away from the sensors in a sequence;
   c) a first signal converter for receiving the sensor output signals from the switch, and for averaging the values of the sensor output signals to produce a first converter output signal indicative of an average of the values of the sensor output signals;
   d) a second signal converter for receiving the sensor output signals from the switch, and for generating a second converter output signal indicative of the distribution of the values of the sensor output signals; and
   e) a processor for receiving the first and second converter output signals, for generating error correction values from the second converter output signal, for correcting the first converter output signal with the error correction values, and for generating a processor output signal which is an accurate measurement of the property.

2. The system of claim 1, wherein each signal converter is an analog-to-digital (A/D) converter.

3. The system of claim 1, wherein the first signal converter includes an analog-to-digital (A/D) converter and a filter for smoothing the sensor output signals.

4. The system of claim 3, wherein the A/D converter and the filter comprise a sigma-delta modulator.

5. The system of claim 1, wherein the second signal converter is directly AC coupled to the switch.

6. The system of claim 1; and further comprising a synchronizer electrically connected to the switch, the first signal converter and the processor for generating and conducting timing signals to the switch, the first signal converter and the processor.

7. The system of claim 1, wherein each sensor is a load cell operative for sensing weight as the physical property to be measured.

8. A system for measuring a weight of a load, comprising:
   a) a distribution of multiple load cells spaced apart from one another and distributed relative to the load, and operative for sensing the weight of the load and generating individual electrical weight output signals having individual amplitudes dependent upon the distribution of the cells;
   b) a switch for conducting the weight output signals away from the cells in a sequence;
   c) a first signal converter for receiving the weight output signals from the switch, and for averaging the amplitudes of the weight output signals to produce a first converter output signal indicative of an average of the amplitudes of the weight output signals;
   d) a second signal converter for receiving the weight output signals from the switch, and for generating a second converter output signal indicative of the distribution of the amplitudes of the weight output signals; and
   e) a processor for receiving the first and second converter output signals, for generating error correction amplitudes from the second converter output signal, for correcting the first converter output signal with the error correction amplitudes, and for generating a processor output signal which is an accurate measurement of the weight of the load.

9. The system of claim 8, wherein each signal converter is an analog-to-digital (A/D) converter.

10. The system of claim 8, wherein the first signal converter includes an analog-to-digital (A/D) converter and a filter for smoothing the weight output signals.

11. The system of claim 10, wherein the A/D converter and the filter comprise a sigma-delta modulator.

12. The system of claim 8, wherein the second signal converter is directly AC coupled to the switch.

13. The system of claim 8; and further comprising a synchronizer electrically connected to the switch, the first signal converter and the processor for generating and conducting timing signals to the switch, the first signal converter and the processor.

* * * * *